United States Patent
Endo et al.

(10) Patent No.: US 9,097,907 B2
(45) Date of Patent: Aug. 4, 2015

(54) PROJECTOR HAVING RETARDATION FILMS UPSTREAM AND DOWNSTREAM OF A POLARIZATION SWITCHING LIQUID CRYSTAL PANEL

(71) Applicant: SEIKO EPSON CORPORATION, Tokyo (JP)

(72) Inventors: Takashi Endo, Azumino (JP); Kasei Sekiguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 268 days.

(21) Appl. No.: 13/800,088

(22) Filed: Mar. 13, 2013

(65) Prior Publication Data

US 2013/0242210 A1     Sep. 19, 2013

(30) Foreign Application Priority Data

Mar. 19, 2012 (JP) ................. 2012-062015

(51) Int. Cl.
  *G02B 5/32* (2006.01)
  *G02B 27/26* (2006.01)
  (Continued)

(52) U.S. Cl.
  CPC ............ *G02B 27/283* (2013.01); *G02B 5/3041* (2013.01); *G02B 5/3083* (2013.01); *G02B 5/32* (2013.01); *G02B 27/1046* (2013.01); *G02B 27/145* (2013.01); *G02B 27/149* (2013.01); *G02B 27/26* (2013.01); *G02B 27/286* (2013.01);
  (Continued)

(58) Field of Classification Search
  CPC .... G02B 27/283; G02B 27/145; G02B 27/26; G02B 27/149; G02B 27/1046; G02B 27/286; G02B 5/3041; H04N 9/3197; H04N 9/3167; H04N 9/3126; H04N 9/3105; H04N 13/0434; G02F 1/13363; G02F 1/01; G02F 1/0136; G03B 21/14; G03B 33/12
  USPC .................. 353/20; 359/256, 489.01, 489.06, 359/489.15, 489.16, 486.02; 348/752, 767
  See application file for complete search history.

(56) References Cited

U.S. PATENT DOCUMENTS

| | | | |
|---|---|---|---|
| 7,021,766 B2 * | 4/2006 | Uehara | 353/20 |
| 2005/0078278 A1 * | 4/2005 | Uehara et al. | 353/20 |

(Continued)

FOREIGN PATENT DOCUMENTS

| | | |
|---|---|---|
| CN | 100374904 C | 3/2008 |
| JP | A-2003-5132 | 1/2003 |
| JP | B2-4707270 | 3/2011 |

*Primary Examiner* — William C Dowling
*Assistant Examiner* — Magda Cruz
(74) *Attorney, Agent, or Firm* — Oliff PLC (57) ABSTRACT

A projector includes a light modulation unit including a liquid crystal device that modulates illumination light to form image light and a light exiting-side polarizer that causes the image light from the liquid crystal device to exit as linearly polarized light, a first retardation film that changes the polarization state of the image light from the light exiting-side polarizer into circular polarization or elliptical polarization, a polarization switching liquid crystal panel that switches the polarization state of the image light from the first retardation film in accordance with a control signal, a second retardation film that changes the polarization state of the image light from the polarization switching liquid crystal panel into linear polarization, and a birefringent substrate that selectively refracts a light component polarized in a direction corresponding to a specific switching state of the polarization switching liquid crystal panel among the image light from the second retardation film.

6 Claims, 7 Drawing Sheets

(51) Int. Cl.
    G02F 1/01      (2006.01)
    G03B 21/14     (2006.01)
    G03B 33/12     (2006.01)
    G02B 27/28     (2006.01)
    G02F 1/1335    (2006.01)
    G02B 5/30      (2006.01)
    G02B 27/14     (2006.01)
    G02B 27/10     (2006.01)
    H04N 9/31      (2006.01)
    H04N 13/04     (2006.01)
    G02F 1/13363   (2006.01)
    G03B 21/20     (2006.01)

(52) U.S. Cl.
    CPC ............... *G02F 1/01* (2013.01); *G02F 1/0136* (2013.01); *G02F 1/1335* (2013.01); *G02F 1/13363* (2013.01); *G03B 21/14* (2013.01); *G03B 33/12* (2013.01); *H04N 9/3105* (2013.01); *H04N 9/3126* (2013.01); *H04N 9/3167* (2013.01); *H04N 9/3197* (2013.01); *H04N 13/0434* (2013.01); G02F 2001/133638 (2013.01); G03B 21/2073 (2013.01)

(56) References Cited

U.S. PATENT DOCUMENTS

2006/0209220 A1    9/2006  Hara et al.
2006/0262233 A1*  11/2006  Uehara et al. .............. 349/5
2011/0304827 A1*  12/2011  Itoh ........................... 353/20

* cited by examiner

PROJECTOR HAVING RETARDATION FILMS UPSTREAM AND DOWNSTREAM OF A POLARIZATION SWITCHING LIQUID CRYSTAL PANEL

BACKGROUND

1. Technical Field

The present invention relates to a projector that projects an image formed of a virtually increased number of pixels based on pixel shift.

2. Related Art

There is a known projector that uses a technology for virtually increasing the number of pixels based on a birefringence phenomenon. For example, there is a known projector to which an optical path modulation unit is added (see JP-A-2003-5132). The optical path modulation unit includes a polarization modulation device that switches the polarization state of light passing therethrough by turning on and off a power supply and a birefringence plate that based on birefringence transmits a specific polarization component by spatially modulating (shifting) the optical path thereof and transmits other polarization components without modulating (shifting) the optical paths thereof. The projector can display an image formed of pixels the number of which is twice as many as a standard number by synchronizing the switching operation of the polarization modulation device provided in the optical path modulation unit with the display timing of an image display device.

In a mechanism in which optical path modulation causes pixel shift as illustrated by the optical path modulation unit in JP-A-2003-5132, however, when part of the light is reflected and returns to the image display device or any other component where an image is formed, the part of light forms a light component traveling in an unintended direction (light component traveling toward image light projection side, for example), contributing to ghost light generation, a decrease in ANSI contrast, and other types of degradation in image quality.

SUMMARY

An advantage of some aspects of the invention is to provide a projector capable of virtually increasing the number of pixels based on pixel shift and suppressing ghost light generation, a decrease in ANSI contrast, and other types of degradation in image quality resulting from unintended reflected light.

An aspect of the invention is directed to a projector including: a light modulation unit having a liquid crystal device that modulates illumination light to form image light and a light exiting-side polarizer that is disposed on a light exiting side of the liquid crystal device and causes the image light to exit as linearly polarized light; a first retardation film that is disposed downstream of the light modulation unit and changes the polarization state of the image light having exited from the light exiting-side polarizer into circular polarization or elliptical polarization; a polarization switching liquid crystal panel that is disposed downstream of the first retardation film and switches the polarization state of the image light having exited from the first retardation film in accordance with a control signal; a second retardation film that is disposed downstream of the polarization switching liquid crystal panel and changes the polarization state of the image light having exited from the polarization switching liquid crystal panel into linear polarization; and a birefringent substrate that is disposed downstream of the second retardation film and selectively refracts a light component polarized in a direction corresponding to a specific switching state of the polarization switching liquid crystal panel, among the image light having exited from the second retardation film.

According to the projector described above, the switching liquid crystal panel, the second retardation film, and the birefringent substrate allow optical path shift, that is, pixel shift, whereby an image formed of a virtually increased number of pixels can be displayed. In the display operation described above, the first retardation film can change linearly polarized image light having passed through the light exiting-side polarizer into circularly or elliptically polarized image light. As a result, part of the image light, that is, light reflected off the polarization switching liquid crystal panel travels back again through the first retardation film, and the light having traveled back and passed through the first retardation film is changed to polarized light that tends to be absorbed by the light exiting-side polarizer, specifically, light containing a component polarized in a direction perpendicular to the polarization axis or the transmission axis of the light exiting-side polarizer. Ghost light generation and a decrease in ANSI contrast resulting from the light component is therefore suppressed, whereby a high-quality image is formed.

In a specific aspect or viewpoint of the invention, the first retardation film is a $\lambda/4$ retardation film, is so disposed that a slow axis thereof is inclined by 45° to a transmission axis of the light exiting-side polarizer, and converts the polarization state of the image light incident from the light exiting-side polarizer into circular polarization. In this case, the image light having passed through the first retardation film is circularly polarized, which is readily handled afterwards.

In another viewpoint of the invention, the second retardation film is a $\lambda/4$ retardation film and converts the polarization state of the image light incident from the polarization switching liquid crystal panel into linear polarization. In this case, since the polarization state of the image light having passed through the second retardation film is switched to polarization in one of two directions perpendicular to each other in accordance with the operation of the polarization switching liquid crystal panel, an image can be displayed with an image formed of shifted pixels and an image formed of non-shifted pixels separated from each other in a well balanced manner.

In still another viewpoint of the invention, the second retardation film is so disposed that a slow axis thereof is perpendicular or parallel to a transmission axis of the light exiting-side polarizer. In this case, the pixels are shifted in an oblique direction between the direction perpendicular to the transmission axis and the direction parallel to the transmission axis, whereby pixel interpolation is not directionally biased.

In yet another viewpoint of the invention, the light modulation unit is formed of a plurality of liquid crystal devices that are provided for respective colors and illuminated with respective color light fluxes to form color image light fluxes and a plurality of light exiting-side polarizers that are provided in correspondence with the plurality of liquid crystal devices and cause the image light fluxes to exit as linearly polarized light fluxes, and the projector further includes a combining prism that is disposed between the light modulation unit and the first retardation film, combines the color image light fluxes having been formed by the plurality of liquid crystal devices and having passed through the plurality of light exiting-side polarizers, and causes the combined light to be incident on the first retardation film. In this case, the plurality of liquid crystal devices allow a bright color image to be projected and a high-resolution, high-definition image to be projected.

In still yet another viewpoint of the invention, in the projector, a set of the first retardation film, the polarization switching liquid crystal panel, the second retardation film, and the birefringent substrate form a first optical path switching section that selectively causes optical path shift in a first direction, and another set of the first retardation film, the polarization switching liquid crystal panel, the second retardation film, and the birefringent substrate form a second optical path switching section that is disposed downstream of the first optical path switching section and selectively causes optical path shift in a second direction different from the first direction. In this case, the pixel shift occurs in the following three directions: the first direction; the second direction; and the middle direction between the first direction and the second direction, whereby an image formed of pixels the number of which is four times greater than a standard number can be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
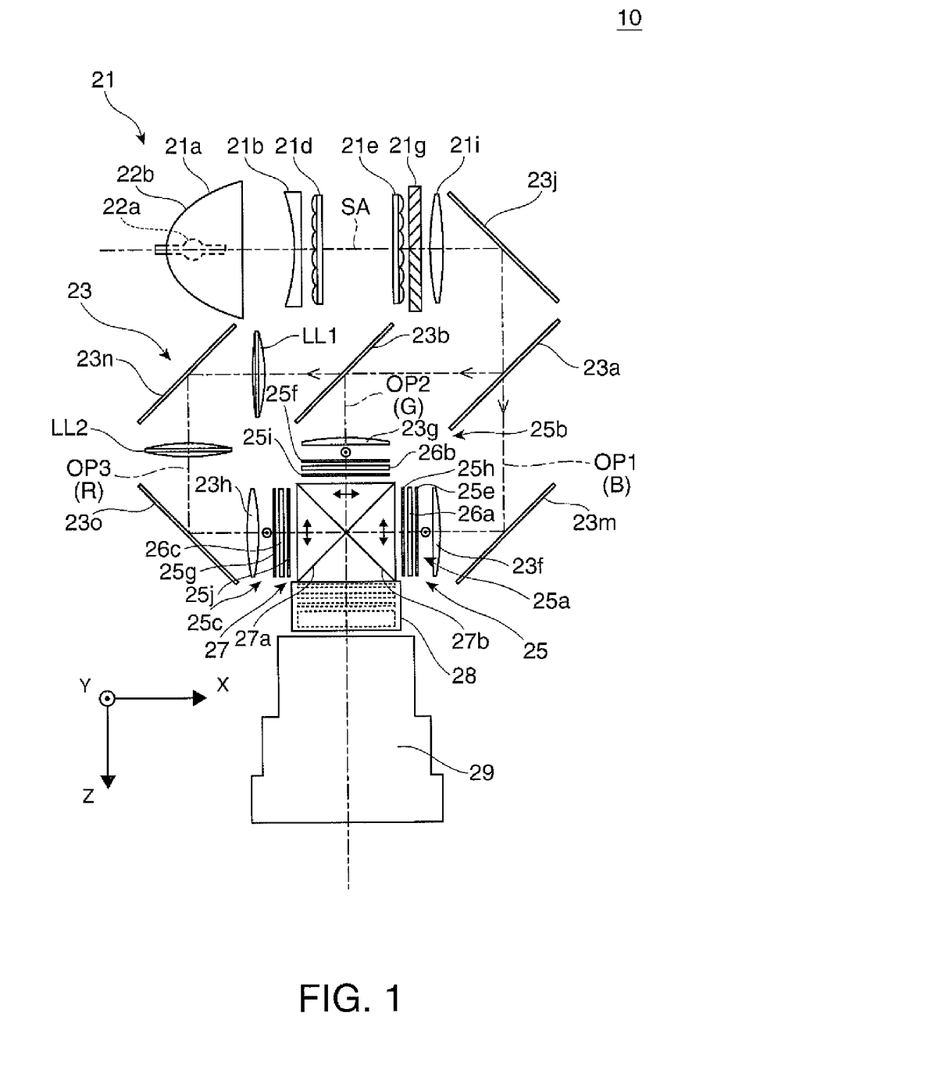
FIG. 1 describes an optical system of a projector according to a first embodiment.

FIG. 1 is a conceptual diagram for describing an optical system of a projector according to a first embodiment of the invention.

A projector 10 according to the first embodiment includes a light source apparatus 21 that emits light source light, a color separation system 23 that separates the light source light from the light source apparatus 21 into blue, green, and red three color components, a light modulation unit 25 illuminated with the color illumination light fluxes having exited from the color separation system 23, a cross dichroic prism 27, which is a combining prism that combines color image light fluxes having exited from the light modulation unit 25, an optical path switcher 28 that slightly shifts the optical path of the combined image light having passed through the cross dichroic prism 27, and a projection lens 29 that projects the image light having passed through the optical path switcher 28 on a screen (not shown).

It is assumed in the description that a plane including a system optical axis SA in the overall projector 10 is a reference plane of the projector 10. In the drawings, the reference plane is parallel to an XZ plane.

In the thus configured projector 10, the light source apparatus 21 includes a light source lamp 21a, a concave lens 21b, a pair of lens arrays 21d and 21e, a polarization conversion member 21g, and a superimposing lens 21i. Among the components described above, the light source lamp 21a includes a lamp body 22a, which is a high-pressure mercury lamp or any other suitable light source, and a concave mirror 22b, which collects the light source light and directs the collected light forward. The concave lens 21b, which serves to parallelize the light source light from the light source lamp 21a, can be omitted, for example, when the concave mirror 22b is a parabolic mirror. Each of the pair of lens arrays 21d and 21e is formed of a plurality of element lenses arranged in a matrix, which divide the light source light having originated from the light source lamp 21a and passed through the concave lens 21b, and each of the element lenses individually causes light incident thereon to converge or diverge. The polarization conversion member 21g, although will not be described in detail, includes a prism array into which PBSs and mirrors are incorporated and wave plate arrays attached to the light exiting surface of the prism array and arranged in stripes. The polarization conversion member 21g converts the light source light fluxes having exited from the lens array 21e only into light fluxes linearly polarized, for example, in a first polarization direction perpendicular to the plane of view of FIG. 1 (more specifically, parallel to line of intersection between first dichroic mirror 27a and second dichroic mirror 27b of cross dichroic prism 27, which will be described later) and supplies the downstream optical system with the linearly polarized light fluxes. The superimposing lens 21i causes as appropriate the illumination light having passed through the polarization conversion member 21g to converge as a whole for superimposed illumination on liquid crystal light valves 25a, 25b, and 25c for the respective colors provided in the light modulation unit 25. That is, the illumination light having passed through the two lens arrays 21d and 21e and the superimposing lens 21i passes through the color separation system 23, which will be described below in detail, and provides uniform superimposed illumination on the liquid crystal panel 26a, 26b, and 26c for the respective colors provided in the light modulation unit 25.

The color separation system 23 includes first and second dichroic mirrors 23a, 23b, field lenses 23f, 23g, and 23h, and reflection mirrors 23j, 23m, 23n, and 23o. The light source apparatus 21 and the color separation system 23 together form an illuminator. Among the blue, green, and red three color light fluxes, the first dichroic mirror 23a, for example, transmits the blue (B) light flux and reflects the green (G) and red (R) light fluxes. The second dichroic mirror 23b, on which the green and red two color light fluxes are incident, for example, reflects the green (G) light flux and transmits the red (R) light flux. The B light, the G light, and the R light, which form the light source light, are thus guided along first, second, and third optical paths OP1, OP2, OP3, respectively, and incident on different objects to be illuminated. Specifically, the light source light from the light source apparatus 21 is incident on the reflection mirror 23j, where the optical path of the light source light is deflected, and then incident on the first dichroic mirror 23a. The B light having passed through the first dichroic mirror 23a is reflected off the reflection mirror 23m and incident on the field lens 23f, which faces the liquid crystal light valve 25a. The G light reflected off the first dichroic mirror 23a and further reflected off the second dichroic mirror 23b is incident on the field lens 23g, which faces the liquid crystal light valve 25b. The R light having passed through the second dichroic mirror 23b passes through lenses LL1 and LL2, are reflected off the reflection mirrors 23n and 23o, and are incident on the field lens 23h, which faces the liquid crystal light valve 25c. The field lenses 23f, 23g, and 23h have a function of adjusting the angles of incidence of the illumination light fluxes to be incident on the liquid crystal light valves 25a, 25b, and 25c. The lenses LL1 and LL2 and the field lens 23h form a relay system. The relay system has a function of conveying an image of the first lens LL1 substantially as it is through the second lens LL2 to the field lens 23h.

The light modulation unit 25 includes the three liquid crystal light valves 25a, 25b, and 25c in correspondence with the three optical paths OP1, OP2, and OP3 for the respective colors described above. Each of the liquid crystal light valves 25a, 25b, and 25c is a non-luminous light modulator that modulates the spatial intensity distribution of illumination light incident thereon.

The liquid crystal light valve 25a for color B disposed in the first optical path OP1 is an embodiment of a liquid crystal device, which is a liquid crystal display apparatus, and includes a liquid crystal panel 26a, which is illuminated with the B light, a light incident-side polarizer 25e, which is disposed on the light incident side of the liquid crystal panel 26a, and a light exiting-side polarizer 25h, which is disposed on the light exiting side of the liquid crystal panel 26a. The liquid crystal light valve 25a is disposed downstream of the field lens 23f provided in the color separation system 23 and uniformly illuminated with the B light having passed through the first dichroic mirror 23a. In the liquid crystal light valve 25a, the light incident-side polarizer 25e, on which the B light is incident, selectively transmits light linearly polarized in the first polarization direction, which is perpendicular to the plane of view, and guides the transmitted light to the liquid crystal panel 26a. The first polarization direction means a direction parallel to the line of intersection between a first dichroic mirror 27a and a second dichroic mirror 27b of the cross dichroic prism 27 as described above. The liquid crystal panel 26a partially converts the light incident thereon, which is linearly polarized in the first polarization direction, for example, into light linearly polarized in a second polarization direction parallel to the plane of view in accordance with an image signal. The second polarization direction means a direction perpendicular to the line of intersection between the first dichroic mirror 27a and the second dichroic mirror 27b of the cross dichroic prism 27. The light exiting-side polarizer 25h selectively transmits only the light modulated by the liquid crystal panel 26a and linearly polarized in the second polarization direction.

The liquid crystal light valve 25b for color G disposed in the second optical path OP2 is an embodiment of a liquid crystal device, which is a liquid crystal display apparatus, and includes a liquid crystal panel 26b, which is illuminated with the G light, a light incident-side polarizer 25f, which is disposed on the light incident side of the liquid crystal panel 26b, and a light exiting-side polarizer 25i, which is disposed on the light exiting side of the liquid crystal panel 26b. The liquid crystal light valve 25b is disposed downstream of the field lens 23g provided in the color separation system 23 and uniformly illuminated with the G light reflected off the second dichroic mirror 23b. In the liquid crystal light valve 25b, the light incident-side polarizer 25f, on which the G light is incident, selectively transmits light linearly polarized in the first polarization direction, which is perpendicular to the plane of view, and guides the transmitted light to the liquid crystal panel 26b. The liquid crystal panel 26b partially converts the light incident thereon, which is linearly polarized in the first polarization direction, for example, into light linearly polarized in the second polarization direction, which is parallel to the plane of view, in accordance with an image signal.

The liquid crystal light valve 25c for color R disposed in the third optical path OP3 is an embodiment of a liquid crystal device, which is a liquid crystal display apparatus, and includes a liquid crystal panel 26c, which is illuminated with the R light, a light incident-side polarizer 25g, which is disposed on the light incident side of the liquid crystal panel 26c, and a light exiting-side polarizer 25j, which is disposed on the light exiting side of the liquid crystal panel 26c. The liquid crystal light valve 25c is disposed downstream of the field lens 23h provided in the color separation system 23 and uniformly illuminated with the R light having passed through the second dichroic mirror 23b. In the liquid crystal light valve 25c, the light incident-side polarizer 25g, on which the R light is incident, selectively transmits light linearly polarized in the first polarization direction, which is perpendicular to the plane of view, and guides the transmitted light to the liquid crystal panel 26c. The liquid crystal panel 26c partially converts the light incident thereon, which is linearly polarized in the first polarization direction, for example, into light linearly polarized in the second polarization direction, which is parallel to the plane of view, in accordance with an image signal. The light exiting-side polarizer 25j selectively transmits only the light modulated by the liquid crystal panel 26c and linearly polarized in the second polarization direction.

The cross dichroic prism 27, which corresponds to a light combining system, is formed by bonding four rectangular prisms and thus has a substantially square shape when viewed from above. A pair of X-shaped, intersecting dichroic mirrors 27a and 27b are formed along the interfaces between the bonded rectangular prisms. The dichroic mirrors 27a and 27b are formed of dielectric multilayer films having characteristics different from each other. That is, one of the dichroic mirrors, the first dichroic mirror 27a, reflects B light, and the other one, the second dichroic mirror 27b, reflects R light. In the cross dichroic prism 27, the modulated B light from the liquid crystal light valve 25a is reflected off the first dichroic mirror 27a and exits to the left when viewed in the traveling direction. The modulated G light from the liquid crystal light valve 25b passes through the first and second dichroic mirrors 27a, 27b and travels straight through and exits out of the cross dichroic prism 27. The modulated R light from the liquid crystal light valve 25c is reflected off the second dichroic mirror 27b and exits to the right when viewed in the travelling direction. That is, color image light that is a combination of the B light, the G light, and the R light exits out of the cross dichroic prism 27.

The optical path switcher 28 operates in synchronization with display switching operation performed by the liquid crystal light valves 25a, 25b, and 25c in the light modulation unit 25 and slightly shifts the optical path of the image light having exited out of the cross dichroic prism 27 or does not shift them at all, allowing pixel interpolation and hence a virtual increase in the number of pixels, which will be described later in detail.

The projection lens 29 serves as a projection system and projects the combined color image light from the cross dichroic prism 27 on a screen (not shown) at a desired magnification factor. That is, color video images or a color still image corresponding to drive signals or image signals inputted to the liquid crystal panels 26a to 26c is projected on the screen at a desired magnification factor.

Figure 2:
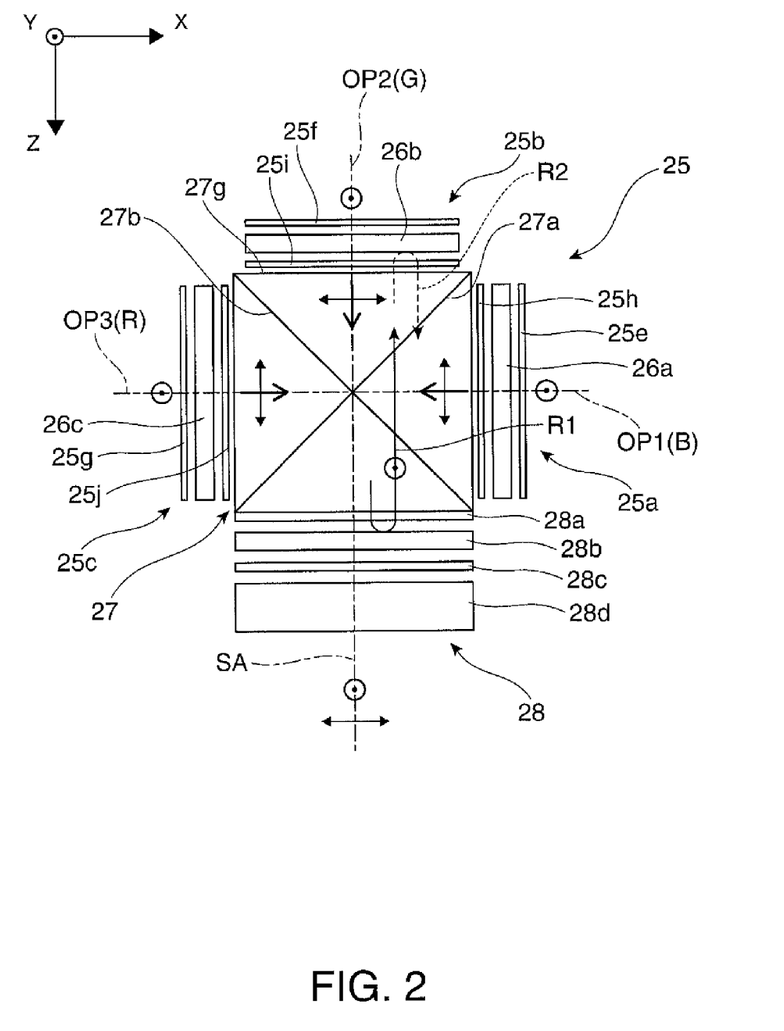
FIG. 2 is an enlarged partial view for describing the structure of an optical path switcher in the projector shown in FIG. 1.

FIG. 2 is an enlarged conceptual diagram for describing the structure of the optical path switcher 28 disposed on the light exiting side of the cross dichroic prism 27 and other components.

The optical path switcher 28 includes a first retardation film 28a, a polarization switching liquid crystal panel 28b, a second retardation film 28c, and a birefringent substrate 28d arranged in this order along the optical path. The first retardation film 28a is disposed downstream of the cross dichroic prism 27 and so supported that it faces a light exiting surface 27g of the cross dichroic prism 27 in parallel thereto. The first retardation film 28a changes the polarization state of the image light having exited from each of the light exiting-side polarizers 25h, 25i, and 25j to circular polarization. The polarization switching liquid crystal panel 28b is disposed downstream of the first retardation film 28a and so supported that it faces the first retardation film 28a in parallel thereto. The polarization switching liquid crystal panel 28b switches the polarization state of the image light having exited from the first retardation film 28a to one of two types of circular polarization in accordance with a control signal. The second retardation film 28c is disposed downstream of the polarization switching liquid crystal panel 28b and so supported that it faces the polarization switching liquid crystal panel 28b in parallel thereto. The second retardation film 28c converts the polarization state of the image light having exited from the polarization switching liquid crystal panel 28b into one of a pair of linear polarization states having oppositely inclined polarization directions in accordance with the polarization state of the image light, that is, either of the two types of circular polarization. The birefringent substrate 28d is disposed downstream of the second retardation film 28c and so supported that it faces the second retardation film 28c in parallel thereto. The birefringent substrate 28d translates the optical path of the image light having exited from the second retardation film 28c in accordance with the polarization direction of the image light by selectively refracting the light component polarized in the direction corresponding to a specific switching state achieved by the polarization switching liquid crystal panel 28b. Specifically, the birefringent substrate 28d allows the image light to travel straight when the polarization switching liquid crystal panel 28b operates in an OFF state, whereas shifting the image light in an oblique direction by one-half a pixel when the polarization switching liquid crystal panel 28b operates in an ON state.

Figure 3:
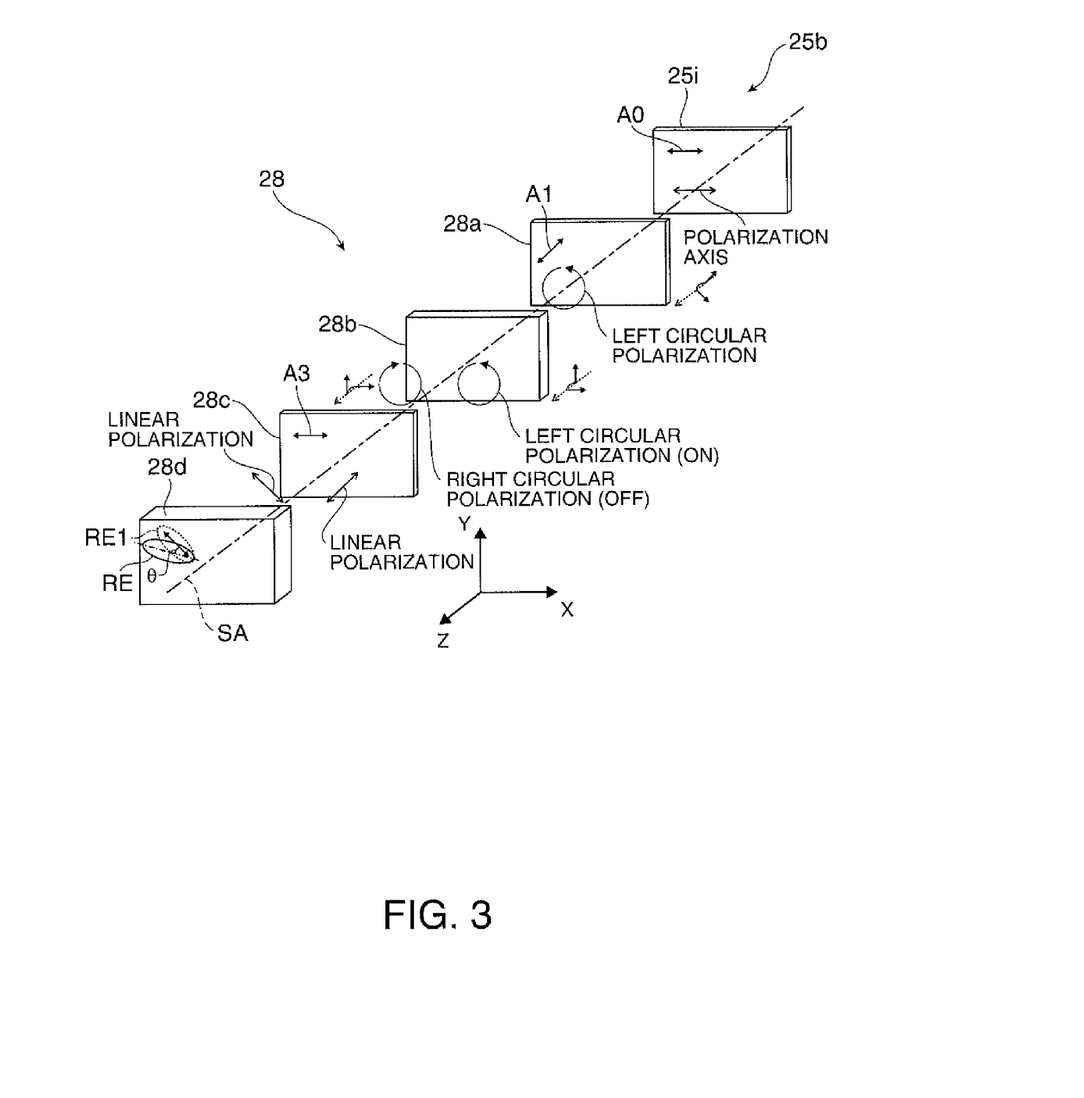
FIG. 3 is a perspective view for describing the role of the optical path switcher.

FIG. 3 is an exploded perspective view of the optical path switcher 28 for more specifically describing the operation thereof. The light exiting-side polarizer 25i of the liquid crystal light valve 25b for color G has a transmission axis (polarization axis) A0 extending in the horizontal X direction parallel to the reference plane, that is, the XZ plane and transmits only polarized light modulated by the liquid crystal panel 26b shown in FIG. 2 and having a horizontal (X direction) polarization plane. The first retardation film 28a of the optical path switcher 28 is a λ/4 retardation film, that is, a quarter wave plate, and has a slow axis A1 extending in the direction inclined rightward and upward by 45° (middle direction between +X direction and +Y direction). The linearly polarized light having exited from the light exiting-side polarizer 25i is converted from the horizontally linearly polarized light into left circularly polarized light when passing through the first retardation film 28a. The polarization switching liquid crystal panel 28b is a liquid crystal panel of TN or any other liquid crystal panel type that operates uniformly across the panel and has a structure in which a liquid crystal layer is sandwiched between a pair of light-transmissive substrates each having transparent electrodes formed on the inner surface. When a voltage is applied between the opposing transparent electrodes of the polarization switching liquid crystal panel 28b, the image light incident on the polarization switching liquid crystal panel 28b only experiences an isotropic effect and remains left circularly polarized. On the other hand, when no voltage is applied between the opposing transparent electrodes of the polarization switching liquid crystal panel 28b, the image light incident on the polarization switching liquid crystal panel 28b changes its polarization state in accordance with the orientation of the liquid crystal material. Specifically, the polarization state is converted from the left circular polarization into right circular polarization. That is, the polarization state of the image light having exited from the polarization switching liquid crystal panel 28b is switched to one of the left circular polarization and the right circular polarization in accordance with whether the polarization switching liquid crystal panel 28b operates in the ON or OFF state. The second retardation film 28c is a λ/4 retardation film, that is, a quarter wave plate and has a slow axis A3 extending in a direction parallel to the horizontal X direction, that is, the transmission axis A0. Left circularly polarized light having exited from the polarization switching liquid crystal panel 28b is changed to linearly polarized light having a polarization plane oriented in the direction inclined rightward and upward by 45° (middle direction between +X direction and +Y direction) when passing through the second retardation film 28c. On the other hand, right circularly polarized light having exited from the polarization switching liquid crystal panel 28b is changed to linearly polarized light having a polarization plane oriented in a direction inclined leftward and upward by 45° (middle direction between +X direction and +Y direction) when passing through the second retardation film 28c. The birefringent substrate 28d, which is made of quartz or any other suitable material, causes the linearly polarized light having the polarization plane oriented in the direction inclined rightward and upward by 45° (middle direction between +x direction and +y direction) to travel straight, whereas refracting the linearly polarized light having the polarization plane oriented in the direction inclined leftward and upward by 45° (middle direction between −X direction and +Y direction) so that the light is translated in a direction inclined leftward and downward by 45° and exits out of the birefringent substrate 28d. The birefringent substrate 28d has an index ellipsoid RE whose axis is inclined to the XY plane by an angle θ. When projected onto the XY plane, the index ellipsoid RE becomes an index ellipsoid RE1 having a major axis (optic axis) extending in the direction inclined leftward and upward by 45° (middle direction between −X direction and +Y direction). That is, only image light having a polarization plane that oscillates in a direction perpendicular to the major axis (optic axis) travels straight, whereas image light having a polarization plane that is not perpendicular to the major axis (optic axis) is shifted in a direction inclined leftward and downward by 135°, for example, by one-half a pixel in accordance, for example, with the thickness of the birefringent substrate 28d.

In summary, when the polarization switching liquid crystal panel 28b operates in the ON state and the image light having passed through the polarization switching liquid crystal panel 28b is left circularly polarized, the image light having exited from the second retardation film 28c travels straight through the birefringent substrate 28d. On the other hand, when the polarization switching liquid crystal panel 28b operates in the OFF state and the image light having passed through the polarization switching liquid crystal panel 28b is right circularly polarized, the image light having exited from the second retardation film 28c experiences optical path shift and hence positional shift by one-half a pixel in both the X and Y directions in the birefringent substrate 28d. The slow axis A3 of the second retardation film 28c may alternatively extend in the vertical Y direction, that is, a direction perpendicular to the transmission axis A0. When the slow axis A3 extends in a direction perpendicular to the transmission axis A0, the case where the shift occurs and the case where the shift does not occur are reversed.

The shift of the optical path of the image light from the liquid crystal light valve 25b for color G has been described, and the same holds true for the image light from each of the other liquid crystal light valves 25a and 25c. That is, the image light from the liquid crystal light valve 25a for color B, which passes through the cross dichroic prism 27 and enters the optical path switcher 28, travels straight through the birefringent substrate 28d when the polarization switching liquid crystal panel 28b operates in the ON state, whereas experiencing positional shift by one-half a pixel in the birefringent substrate 28d when the polarization switching liquid crystal panel 28b operates in the OFF state. Similarly, the image light from the liquid crystal light valve 25c for color R, which passes through the cross dichroic prism 27 and enters the optical path switcher 28, travels straight through the birefringent substrate 28d when the polarization switching liquid crystal panel 28b operates in the ON state, whereas experiencing positional shift by one-half a pixel in the birefringent substrate 28d when the polarization switching liquid crystal panel 28b operates in the OFF state.

Figure 4:
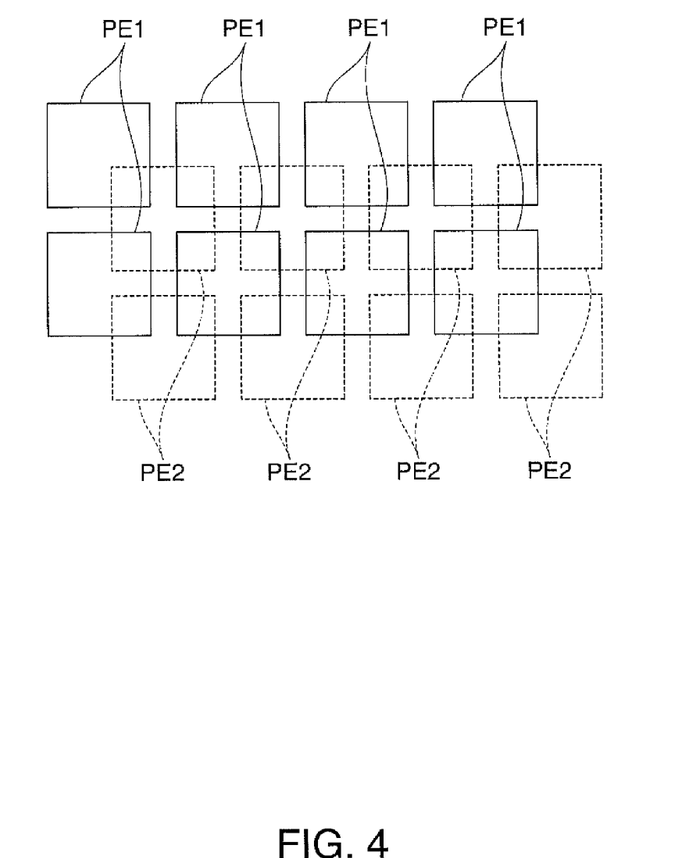
FIG. 4 is a conceptual diagram for describing an image projected by the projector shown in FIG. 1.

FIG. 4 describes an image projected by the projector 10 shown in FIG. 1. When the polarization switching liquid crystal panel 28b shown in FIG. 3 and other figures operates in the ON state, no optical path shift occurs in the birefringent substrate 28d, and an image is formed by pixels PE1 arranged as indicated by the solid lines. On the other hand, when the polarization switching liquid crystal panel 28b shown in FIG. 3 and other figures operates in the OFF state, optical path shift occurs in the birefringent substrate 28d, and an image is formed by modulated pixels PE2 produced by shifting the basic arrangement of the pixels PE1 obliquely by one-half a pixel and arranged as indicated by the dotted lines. That is, the pixels PE2 corresponding to the polarization switching liquid crystal panel 28b operating in the OFF state are so projected that the pixels PE2 interpolate the pixels PE1 corresponding to the polarization switching liquid crystal panel 28b operating in the ON state.

The ON and OFF operation of the polarization switching liquid crystal panel 28b is synchronized with the operation of the liquid crystal light valve 25b. Specifically, for example, the polarization switching liquid crystal panel 28b can be switched between the ON and OFF states whenever the liquid crystal light valve 25b redraws an image once or multiple times. In this process, it is desirable for the liquid crystal light valve 25b not to redraw an image during the ON and OFF switching operation of the polarization switching liquid crystal panel 28b.

A description will next be made of how to handle stray light. Since the polarization switching liquid crystal panel 28b slightly reflects image light, reflected return light R1 is formed as shown in FIG. 2. The reflected return light R1 is left circularly polarized and converted into light polarized in the vertical direction (Y direction) when passing through the first retardation film 28a, which is a quarter wave plate. The reflected return light R1 is therefore absorbed, for example, by the light exiting-side polarizer 25i of the liquid crystal light valve 25b and hence will not form re-reflected noise light R2 directed again toward the projection lens 29. On the other hand, in an optical path switcher of related art, which has no first or second retardation film 28a, 28c, the reflected return light R1 remains polarized in the horizontal direction (X direction), and a black matrix or any other component in the liquid crystal panel 26b therefore disadvantageously produces re-reflected noise light R2. As a result, ghost light is produced or the ANSI contrast decreases.

According to the projector 10 of the present embodiment, the polarization switching liquid crystal panel 28b, the second retardation film 28c, and the birefringent substrate 28d allow optical path shift, that is, pixel shift, whereby an image formed of a virtually increased number of pixels can be displayed. In the display operation described above, the first retardation film 28a can change linearly polarized image light having passed through each of the light exiting-side polarizers 25h, 25i, and 25j into circularly polarized image light. As a result, part of the image light, that is, light reflected off the polarization switching liquid crystal panel 28b travels back again through the first retardation film 28a, and the light having traveled back and passed through the first retardation film 28a is changed to polarized light that tends to be absorbed by the light exiting-side polarizers 25h, 25i, and 25j, specifically, light polarized in a direction perpendicular to the polarization axes or the transmission axes of the light exiting-side polarizers 25h, 25i, and 25j. Ghost light generation and a decrease in ANSI contrast resulting from light reflected off the polarization switching liquid crystal panel 28b is therefore suppressed, whereby a high-quality image is formed.

In the above description, the transmission axis (polarization axis) of the light exiting-side polarizer 25i extends in the horizontal X direction parallel to the reference plane, that is, parallel to the XZ plane, but the transmission axis (polarization axis) may alternatively extend in any other suitable direction. For example, when the transmission axis A0 is changed from that shown in FIG. 3 to a transmission axis extending in the Y direction, which is perpendicular to the reference surface, and the slow axis A1 of the first retardation film 28a is rotated by 90° to extend in the direction inclined leftward and upward by 45° (middle direction between −X direction and +Y direction), the polarization states afterwards can be the same as those shown in FIG. 3. In this case as well, since the traveling-back return light R1 shown in FIG. 2 passes through the first retardation film 28a twice in total, the return light R1 is changed to light polarized in a direction perpendicular to the transmission axis (polarization axis), whereby stray light is properly handled. Similarly, the transmission axes of the light exiting-side polarizers 25h and 25j can extend in the Y direction, which is perpendicular to the reference surface.

On the other hand, when the transmission axis A0 is changed from the state in FIG. 3 to be perpendicular to the XZ plane, but the slow axis A1 of the first retardation film 28a is not rotated by 90°, the relationship between the state of the circularly polarized light having passed through the polarization switching liquid crystal panel 28b and the ON and OFF operation of the polarization switching liquid crystal panel 28b is reversed. That is, no optical path shift occurs in the birefringent substrate 28d when the polarization switching liquid crystal panel 28b operates in the OFF state, whereas optical path shift occurs in the birefringent substrate 28d when the polarization switching liquid crystal panel 28b operates in the ON state. In this case, the desired switching operation is achieved by totally swapping the timings at which the polarization switching liquid crystal panel 28b is turned on and off or changing the timings at which image signals are sent to the liquid crystal panels 26a, 26b, and 26c. In this case as well, the return light R1 shown in FIG. 2 is changed to light polarized in a direction perpendicular to the transmission axis.

Further, in the above description, the transmission axes of the light exiting-side polarizers 25h, 25i, and 25j extend in the same direction (direction parallel to XZ plane in the case shown in FIG. 1 and other figures). Alternatively, for example, the transmission axis of the light exiting-side polarizer 25i corresponding to the G light may extend in parallel to the XZ plane, whereas the transmission axes of the light exiting-side polarizers 25h and 25j corresponding to the B light and the R light may extend in a direction perpendicular to the XZ plane. In this case, the desired switching operation is achieved by changing the timing at which image signals are sent to the liquid crystal panels 26*a* and 26*c* with respect to the timing at which an image signal is sent to the liquid crystal panel 26*b*. In this case as well, the return light R1 shown in FIG. 2 is changed to light polarized in a direction perpendicular to the transmission axis.

Further, in the present embodiment, the first retardation film 28*a*, the polarization switching liquid crystal panel 28*b*, the second retardation film 28*c*, and the birefringent substrate 28*d* may be integrated with each other into a unitized member, and the first retardation film 28*a* and the cross dichroic prism 27 may be so disposed that they face in proximity to each other. In this case, the first retardation film 28*a* and the other components can be assembled with improved workability.

Second Embodiment

A projector according to a second embodiment of the invention will next be described. The projector according to the second embodiment is a variation of the projector according to the first embodiment, and portions that will not be particularly described are the same as those in the first embodiment.

Figure 5:
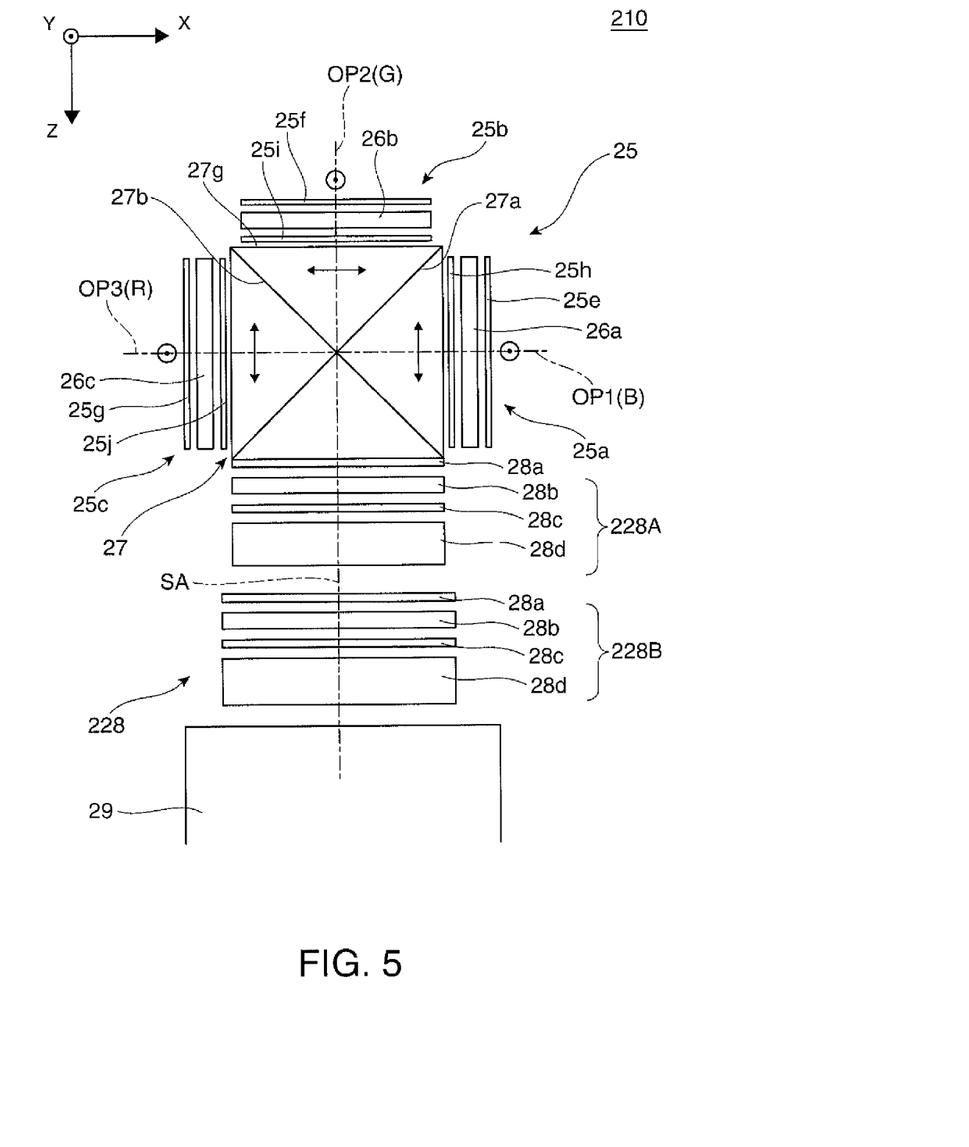
FIG. 5 is an enlarged partial view for describing a projector according to a second embodiment.
Figure 6:
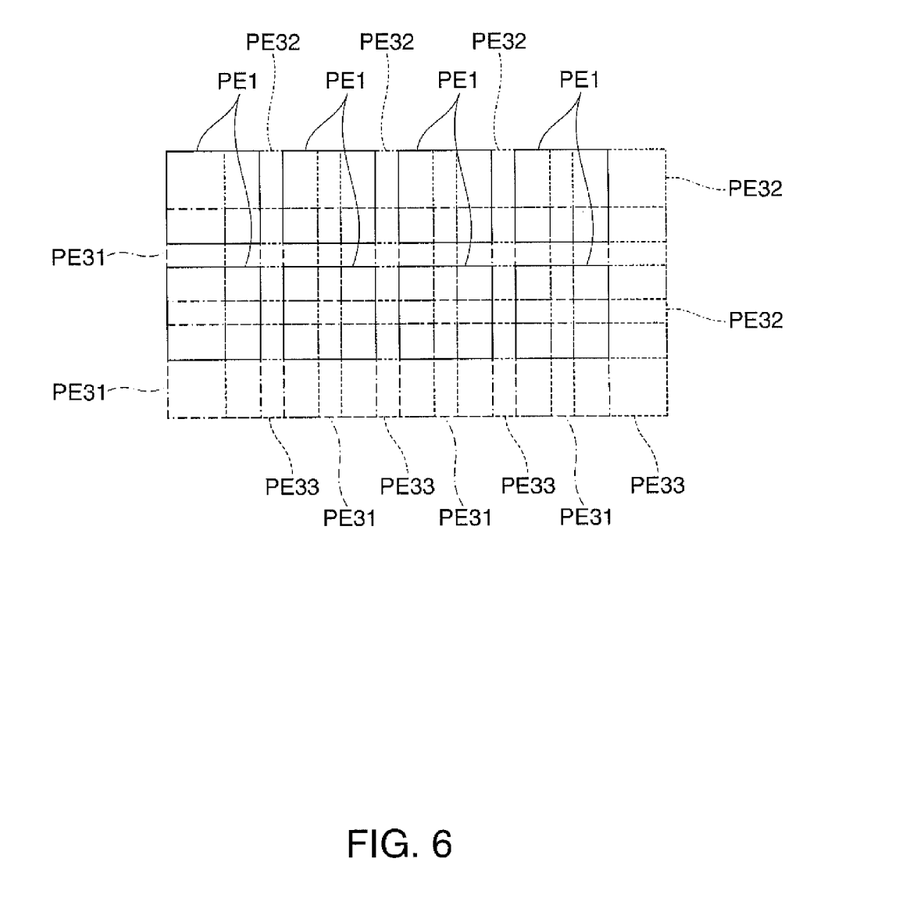
FIG. 6 is a conceptual diagram for describing an image projected by the projector shown in FIG. 5.

In a projector 210 according to the second embodiment, an optical path switcher 228 disposed between the cross dichroic prism 27 and the projection lens 29 has a two-stage structure, as shown in FIG. 5. That is, the optical path switcher 228 includes a first switcher section 228A (first optical path switching section) and a second switcher section 228E (second optical path switching section). Each of the first and second switcher sections 228A, 228E has the same structure as that of the optical path switcher 28 shown in FIG. 2 but differs therefrom in that the slow axes, the optic axes, and other portions are changed. That is, the first switcher section 228A causes optical path shift in the X direction (first direction), and the second switcher section 228B causes optical path shift in the Y direction (second direction). As a result, an image is formed of three-pattern pixels PE31, 32, and 33 arranged by moving the arrangement of the basic pixels PE1 upward or downward, rightward or leftward, and obliquely by one-half a pixel, as shown in FIG. 6.

In the present embodiment, the pixels can be shifted in the following three directions: the X direction; the Y direction; and the middle direction between the X direction and the Y direction, whereby an image formed of pixels the number of which is four times greater than a standard number can be displayed.

Third Embodiment

A projector according to a third embodiment of the invention will be described below. The projector according to the third embodiment is a variation of the projector according to the first embodiment, and portions that will not be particularly described are the same as those in the first embodiment. It is assumed in the present embodiment that a plane including the system optical axis SA and parallel to the XZ plane is the reference plane.

Figure 7:
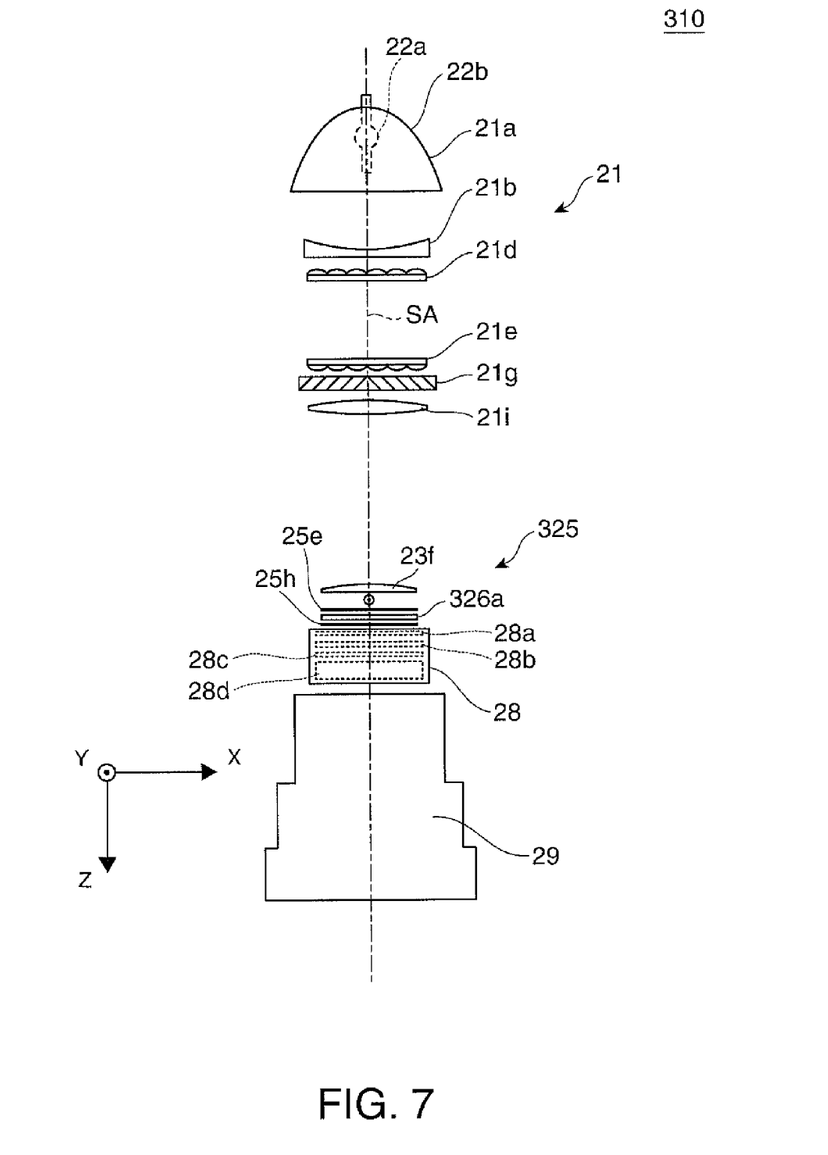
FIG. 7 describes a projector according to a third embodiment.

A projector 310 according to the third embodiment is of single panel type, and a light modulation unit 325 is a liquid crystal light valve including a liquid crystal panel 326*a*, which is a liquid crystal device, a light incident-side polarizer 25*e*, and a light exiting-side polarizer 25*h*, as shown in FIG. 7. The light incident-side polarizer 25*e* is assumed to have a transmission axis (polarization axis) extending in the horizontal X direction, which is parallel to the reference plane.

In this case, it is not necessary to provide a cross dichroic prism on the light exiting side of the light modulation unit 325, and the optical path switcher 28 is disposed between the light modulation unit 325 and the projection lens 29.

In the present embodiment as well, providing the first retardation film 28*a*, the polarization switching liquid crystal panel 28*b*, the second retardation film 28*c*, and the birefringent substrate 28*d*, which form the optical path switcher 28, in corresponding with the transmission axis of the light exiting-side polarizer 25*h* allows optical path shift, that is, pixel shift, whereby an image formed of a virtually increased number of pixels can be displayed. In the image display process, ghost light generation and a decrease in ANSI contrast resulting from light reflected off the polarization switching liquid crystal panel 28*b* is suppressed, whereby a high-quality image is formed.

The invention has been described with reference to the above embodiments, but the invention is not limited thereto. The invention can be implemented in a variety of other aspects to the extent that they do not depart from the substance of the invention. For example, the following variations are conceivable.

For example, in the first embodiment described above, the first retardation film 28*a* forms circularly polarized light, the polarization switching liquid crystal panel 28*b* switches the direction of rotation of the circular polarization, and the second retardation film 28*c* provides an inclined linearly polarized component. In the thus configured first embodiment, the phase difference imparted to the image light can also be changed. Specifically, the first retardation film 28*a* forms elliptically polarized light, the polarization switching liquid crystal panel 28*b* switches the direction of rotation of the elliptical polarization, and the second retardation film 28*c* provides an inclined linearly polarized component.

Further, in the first to third embodiments, in which no optical compensator is incorporated, in each of the liquid crystal light valves 25*a*, 25*b*, and 25*c*, an optical compensator made of a birefringent material and capable of providing a phase difference can be inserted, for example, between the light incident-side polarizer 25*e*, 25*f*, or 25*g* and the liquid crystal panel 26*a*, 26*b*, or 26*c*.

Further, in the projector 10 according to the first embodiment, the light source apparatus 21 is formed of the light source lamp 21*a*, the pair of lens arrays 21*d* and 21*e*, the polarization conversion member 21*g*, and the superimposing lens 21*i*, but the lens arrays 21*d* and 21*e* and other components may be omitted, and the light source lamp 21*a* may be replaced with another light source, such as an LED.

The embodiments described above have been described with reference only to the projector 10 using the three liquid crystal light valves 25*a*, 25*b*, and 25*c* and the projector using the single liquid crystal light valve. The invention is also applicable to a projector using two liquid crystal light valves or a projector using four or more liquid crystal light valves.

The embodiments described above have been described with reference only to a front-projection projector in which an image is projected from the viewer's side, where a viewer observes the screen, but the invention is also applicable to a rear-projection projector in which an image is projected from the side that is opposite the viewer's side.

The entire disclosure of Japanese Patent Application. No. 2012-062015, filed Mar. 19, 2012 is expressly incorporated by reference herein.

What is claimed is:

1. A projector comprising:
a light modulation unit including a liquid crystal device that modulates illumination light to form image light and a light exiting-side polarizer that is disposed on a light exiting side of the liquid crystal device and causes the image light to exit as linearly polarized light;
a first retardation film that is disposed downstream of the light modulation unit and changes the polarization state of the image light having exited from the light exiting-side polarizer into circular polarization or elliptical polarization;
a polarization switching liquid crystal panel that is disposed downstream of the first retardation film and switches the polarization state of the image light having exited from the first retardation film in accordance with a control signal;
a second retardation film that is disposed downstream of the polarization switching liquid crystal panel and changes the polarization state of the image light having exited from the polarization switching liquid crystal panel into linear polarization; and
a birefringent substrate that is disposed downstream of the second retardation film and selectively refracts a light component polarized in a direction corresponding to a specific switching state of the polarization switching liquid crystal panel among the image light having exited from the second retardation film.

2. The projector according to claim 1, wherein the first retardation film is a ¼ retardation film, is so disposed that a slow axis thereof is inclined by 45° to a transmission axis of the light exiting-side polarizer, and converts the polarization state of the image light incident from the light exiting-side polarizer into circular polarization.

3. The projector according to claim 2, wherein the second retardation film is a ¼ retardation film and converts the polarization state of the image light incident from the polarization switching liquid crystal panel into linear polarization.

4. The projector according to claim 1, wherein the second retardation film is so disposed that a slow axis thereof is perpendicular or parallel to a transmission axis of the light exiting-side polarizer.

5. The projector according to claim 1, wherein the light modulation unit is formed of a plurality of liquid crystal devices that are provided for respective colors and illuminated with respective color light fluxes to form color image light fluxes and a plurality of light exiting-side polarizers that are provided in correspondence with the plurality of liquid crystal devices and cause the image light fluxes to exit as linearly polarized light fluxes, and
the projector further comprises a combining prism that is disposed between the light modulation unit and the first retardation film, combines the color image light fluxes having been formed by the plurality of liquid crystal devices and having passed through the plurality of light exiting-side polarizers, and causes the combined light to be incident on the first retardation film.

6. The projector according to claim 1, wherein a set of the first retardation film, the polarization switching liquid crystal panel, the second retardation film, and the birefringent substrate form a first optical path switching section that selectively causes optical path shift in a first direction, and
another set of the first retardation film, the polarization switching liquid crystal panel, the second retardation film, and the birefringent substrate form a second optical path switching section that is disposed downstream of the first optical path switching section and selectively causes optical path shift in a second direction different from the first direction.

* * * * *